United States Patent
Uwagawa et al.

(10) Patent No.: US 6,930,727 B2
(45) Date of Patent: Aug. 16, 2005

(54) PROTECTION-COVER OPENING/CLOSING MECHANISM FOR RECORDING/PLAYBACK APPARATUS

(75) Inventors: Satoshi Uwagawa, Tokyo (JP); Toshiaki Ueda, Saitama (JP)

(73) Assignee: Sony Corporation (JP)

( * ) Notice: Subject to any disclaimer, the term of this patent is extended or adjusted under 35 U.S.C. 154(b) by 602 days.

(21) Appl. No.: 10/102,916

(22) Filed: Mar. 22, 2002

(65) Prior Publication Data

US 2002/0145670 A1 Oct. 10, 2002

(30) Foreign Application Priority Data

Mar. 30, 2001 (JP) .................................... P2001-102345

(51) Int. Cl.⁷ ........................ H04N 5/225; G11B 17/03; G11B 17/04; G11B 33/02
(52) U.S. Cl. ...................... 348/374; 720/639; 720/647; 720/657; 369/79
(58) Field of Search .............................. 348/373, 231.7, 348/374, 375, 376; 386/117, 126; 360/99.06, 99.07; 369/30.9, 30.96, 30.98, 31.01, 30.48, 30.63, 30.69, 30.72, 30.75, 30.84, 29.02, 75.11, 77.11, 79, 256; 720/608, 647, 617, 655, 639, 657, 640, 600, 644

(56) References Cited

U.S. PATENT DOCUMENTS 5,583,834 A * 12/1996 Kanada et al. ............. 369/13.2
5,627,587 A * 5/1997 Murata et al. ............ 348/231.7
5,657,081 A * 8/1997 Kurahashi ................. 348/231.7
5,781,232 A * 7/1998 Ejima ....................... 348/231.7
5,805,219 A * 9/1998 Ejima et al. ................. 348/375
5,963,528 A * 10/1999 Fujimura et al. ............ 720/655
6,118,929 A * 9/2000 Kawamura et al. ......... 386/117
6,493,033 B1 * 12/2002 Glogan et al. ............... 348/375
6,542,186 B2 * 4/2003 Uryu ....................... 348/231.7
6,650,355 B2 * 11/2003 Sasaki ........................ 347/264
6,831,698 B2 * 12/2004 Fuchimukai ................ 348/373

FOREIGN PATENT DOCUMENTS

JP 8-339643 12/1996

* cited by examiner

Primary Examiner—Wendy R. Garber
Assistant Examiner—Justin Misleh
(74) Attorney, Agent, or Firm—Rader, Fishman & Grauer PLLC; Ronald P. Kananen

(57) ABSTRACT

A protection-cover opening/closing mechanism for a digital still camera includes an electromagnet having stator around which an electromagnetic coil is formed and a movable member, a first lever to which the movable member is pivotally attached at a first end portion and which receives a rotational force, a second lever which is able to reciprocate on a stationary member, which is engageable with a second end portion of the first lever, and which is pressed toward an initial position thereof. While a CD-R is being operated, current is applied to the electromagnetic coil to restrain the movable member on the stator and thereby prevent the first lever from rotating, and the movement of the second lever in the direction away from the initial position is limited due to the engagement between the first lever and the second lever, thereby locking a protection cover at a closed position.

9 Claims, 14 Drawing Sheets

PROTECTION-COVER OPENING/CLOSING MECHANISM FOR RECORDING/PLAYBACK APPARATUS

BACKGROUND OF THE INVENTION

1. Field of the Invention

The present invention relates to protection-cover opening/closing mechanisms for recording/playback apparatuses, and more specifically it relates to a digital still camera in which a CD-R is used as a recording medium.

2. Description of the Related Art

In typical protection-cover opening/closing mechanisms, a cover-restraining member mechanically prevents a protection cover from being opened while a recording medium is being operated. However, if the protection cover is forcibly opened, there is a risk that the cover-restraining member will break. Accordingly, it is difficult to protect the recording medium, and the safety of the recording medium depends mainly on the skill of a user who operates the apparatus.

FIG. 14 shows an apparatus disclosed in Japanese Unexamined Patent Application Publication No. 8-339643. With reference to FIG. 14, an apparatus 1' includes an open button 29'. When a user presses the open button 29', a control circuit 18', in which a microcomputer is installed, applies a current to a plunger 23'. When the current is applied to the plunger 23', an iron core of the plunger 23' moves and pushes an end portion of a cover-locking plate 21', so that the cover-locking plate 21' rotates around a locking-plate rotational axis 22' and a cover 2' is released. Since the cover 2' continuously receives a force in the opening direction by a spring force applied by a cover-lifting spring 20', it opens in the direction shown by the arrow K' when it is released from the cover-locking plate 21'.

However, when auto-sensors 31a' and 31b' detect that a pickup 9' is being guided by a first pickup-guiding unit 11', the control circuit 18' does not immediately apply the current to the plunger 23', even when the open button 29' is pressed. The control circuit 18' applies the current to the plunger 23' after the auto-sensors 31a' and 31b' have detected that the pickup 9' has been moved away from the first pickup-guiding unit 11'. In this manner, the control circuit 18' controls the operation of the plunger 23'. Accordingly, the control circuit 18' prevents the cover 2' from being opened when the pickup 9' is guided by the first pickup-guiding unit 11'.

Thus, when the cover 2' is opened, the pickup 9' is guided by one of second and third guiding units 12' and 13', so that the pickup 9', which is constructed of precision components, can be protected while the disk is being exchanged. In addition, since the cover 2' is prevented from being opened while the pickup 9' is being guided by the first pickup guiding unit 11', the lengths of connecting members for connecting the pickup 9' and a signal-processing unit, such as lead wires, etc., can be made shorter. Therefore, failure of and damage to the connecting members can be prevented.

In the apparatus 1', both sides of a disk 4' are subjected to a playback process. However, as long as the button 29' is pressed while the pickup 9' is being guided by one of the second and third pickup-guiding units 12' and 13', the cover 2' can be opened even when the playback process of the disk 4' is being performed. Accordingly, although the pickup 9' can be protected, the disk 4', which is a recording medium, cannot be protected.

SUMMARY OF THE INVENTION

Accordingly, in view of the above-described situation, an object of the present invention is to provide an protection-cover opening/closing mechanism for a recording/playback apparatus in which the protection cover can be reliably prevented from being opened while a recording medium is being operated, without depending on the skill of a user who operates the apparatus.

The object of the present invention can be attained by a protection-cover opening/closing mechanism for a recording/playback apparatus including an electromagnet which includes a stator around which an electromagnetic coil is formed and a movable member, a first lever to which the movable member is pivotally attached at a first end portion of the first lever, and which is supported in such a manner that the first lever is rotatable around a first axis, a first force-applying unit which applies a rotational force around the first axis to the first lever, a second lever which is disposed on a stationary member in such a manner that the second lever is able to reciprocate by sliding on the stationary member in a direction away from and toward an initial position, and which is engageable with a second end portion of the first lever, and a second force-applying unit which applies a force to the second lever in the direction toward the initial position. While a recording medium is being operated, current is applied to the electromagnetic coil to restrain the movable member on the stator by magnetic suction force and thereby prevent the first lever from rotating around the first axis, and the movement of the second lever in the direction away from the initial position is limited within a limit position due to the engagement between the second end portion of the first lever and the second lever, thereby locking a protection cover at a closed position. When the recording medium is not being operated, current is not applied to the electromagnetic coil, so it becomes possible to open the protection cover by moving the second lever away from the initial position beyond the limit position.

As described above, according to the protection-cover opening/closing mechanism for the recording/playback apparatus, even when a user accidentally tries to open the protection cover while the recording medium is being operated, the protection cover is restrained by an electromagnetic locking mechanism.

DESCRIPTION OF THE PREFERRED EMBODIMENT

A digital still camera will be described below as a recording/playback apparatus according to an embodiment of the present invention.

Figure 1:
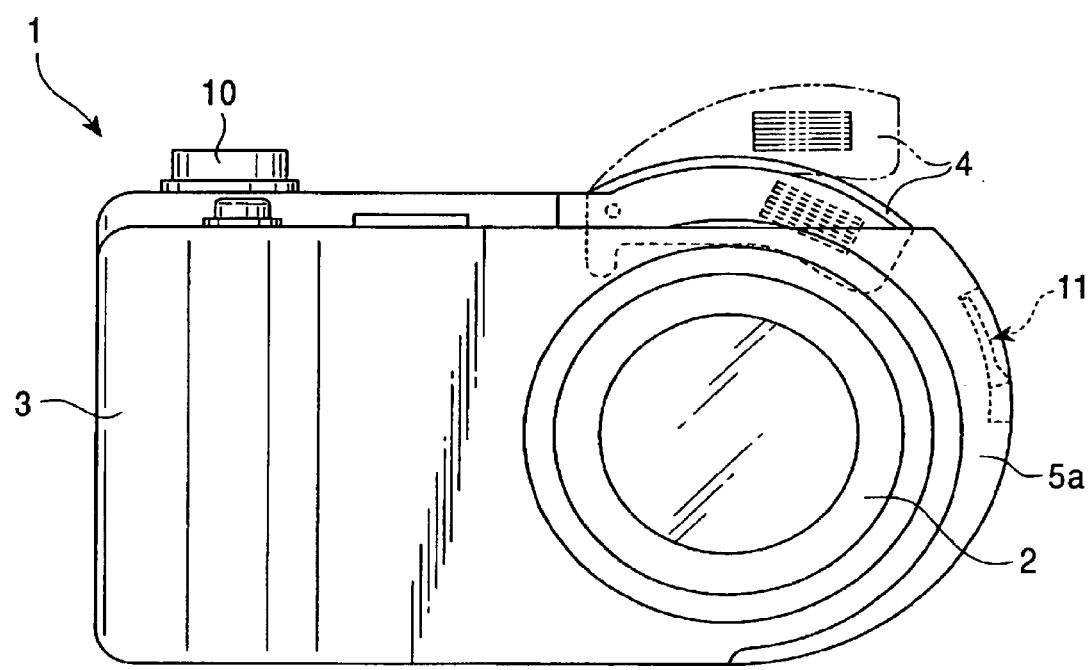
FIG. 1 is a front view of a digital still camera according to an embodiment of the present invention.
Figure 2:
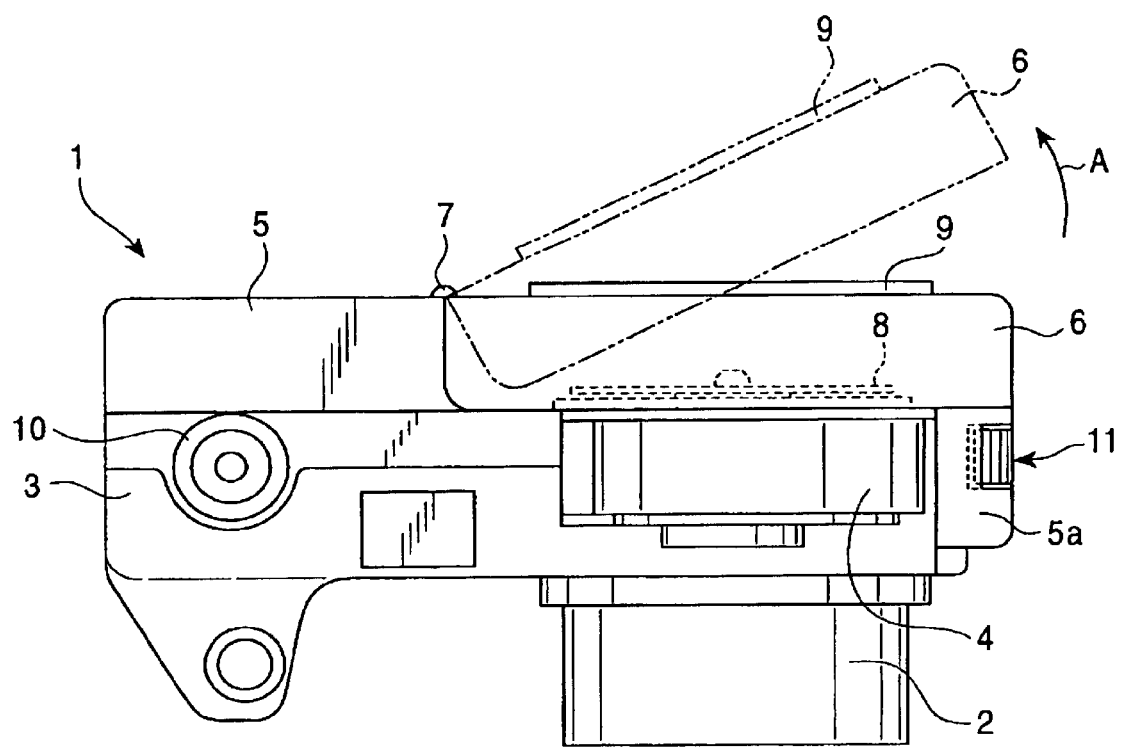
FIG. 2 is a plan view of the digital still camera shown in FIG. 1.

FIGS. 1 and 2 show an overall construction of a digital still camera 1 according to the embodiment of the present embodiment. With reference to FIGS. 1 and 2, a housing unit of the digital still camera 1 is formed by fitting a lens-side housing 3 and a CD-side housing 5, the lens-side housing 3 including a lens unit 2 and the CD-side housing 5 including a protection cover 6 that can be opened and closed. The lens-side housing 3 also is provided with a function-display knob 10 in addition to the lens unit 2. In addition, the CD-side housing 5 also is provided with a pop-up-type electronic flash unit 4 and is integrally formed with a cover-operating housing member 5a, which includes a cover opening/closing unit 11 which is able to reciprocate. One end of the protection cover 6 is pivotally attached to a pivot 7, and, although not shown in the figures, the protection cover 6 receives a counterclockwise rotational force (force in the direction shown by the arrow A in FIG. 2). A CD-R 8, which is shown by dashed lines, is rotatably disposed inside the CD-side housing 5, and a separation wall is formed integrally with the CD-side housing 5 at a position below the CD-R 8. A protection-cover opening/closing mechanism according to the present invention is disposed at a position below the separation wall in FIG. 2. In addition, a liquid-crystal display 9 is disposed at the exterior surface of the protection cover 6.

Next, the protection-cover opening/closing mechanism according to the embodiment of the present invention will be described below with reference to FIG. 3.

Figure 3:
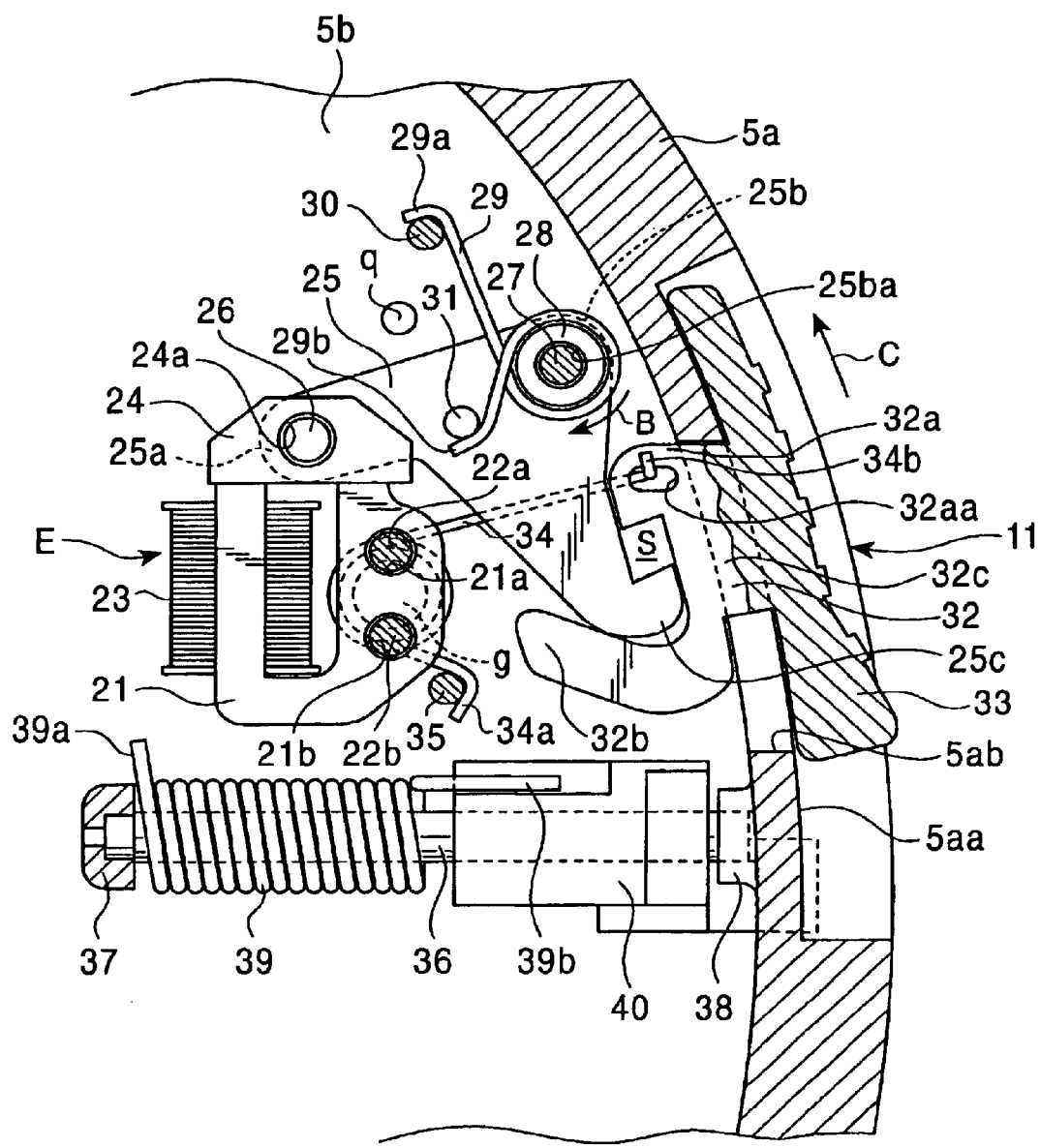
FIG. 3 is a vertical sectional view of a main part of a protection-cover opening/closing mechanism.

FIG. 3 shows a state in which the protection cover 6 (not shown in FIG. 3) of the digital still camera 1 is locked in a closed position. With reference to FIG. 3, a stator 21 having a bracket-shape forms an electromagnet E. An arm portion of the stator 21 at one side thereof is provided with through holes 21a and 21b, into which pins 22a and 22b are respectively fitted, the pins 22a and 22b being attached to a main body 5b (the separation wall formed integrally with the CD-side housing 5). In addition, an electromagnetic coil 23 is wound around an arm portion of the stator 21 at the other side thereof. In the state shown in FIG. 3, a current is applied to the electromagnetic coil 23 (the CD-R is operated), so that an armature 24 (also referred to as a movable member) is restrained on pole faces of the stator 21 by magnetic suction force, as shown in FIG. 3. The armature 24 is provided with a hole 24a at the center thereof, and a pin 26, which is attached to a first end portion 25a of a first lever 25, is loosely fitted into the hole 24a.

More specifically, the armature 24 is engaged with the pin 26 in such a manner that the armature 24 is rotatable around the pin 26. The first lever 25 has an approximately triangular shape, and an end portion 25b, which is at the apex of the triangle, is provided with a hole 25ba. In addition, a pin 27, which is attached to the main body 5b, is rotatably inserted into the hole 25ba. A cylindrical portion 28, which serves as a spring-retaining portion, is formed integrally with the end portion 25b in such a manner that the cylindrical portion 28 is concentric with the hole 25ba. A coil portion of a helical spring 29 is wound around the cylindrical portion 28, and an end portion 29a of the helical spring 29 at one end is retained by a pin 30 that is attached to the main body 5b, and an end portion 29b at the other end is retained by a pin 31 that is attached to the first lever 25.

A second lever 32 having the shape of the letter 'J' is a component of the cover opening/closing unit 11 and includes a first engaging portion 32a and a second engaging portion 32b at the upper and lower parts thereof In the state shown in FIG. 3, the second engaging portion 32b is in contact with a second end portion 25c of the first lever 25. A cylindrical position g is integrally formed with the main body 5b at a position behind one of the arm portions of the stator 21 forming the electromagnet E, and a coil portion of a helical spring 34 is wound around the cylindrical position g. An end portion 34a of the helical spring 34 at one end is retained by a pin 35 that is attached to the main body 5b, and an end portion 34b at the other end is retained by an oblong hole 32aa that is formed in the first engaging portion 32a of the second lever 32 by being bent and hooked thereto. Accordingly, an operating plate 33, which is integrally formed with the second lever 32 and also is a component of the cover opening/closing unit 11, receives a rotational force in the counterclockwise direction about the center of the oblong hole 32aa, as shown by the arrow C in FIG. 3. More specifically, the operating plate 33 receives the force toward the upper left in FIG. 3, and this is the direction in which the operating plate 33 returns to an initial position thereof. The movement of the operating plate 33 toward the upper left in FIG. 3 is restrained at the position shown in FIG. 3, since the first engaging portion 32a abuts against the upper surface of an opening 5ab (see FIG. 11), which is formed in the cover-operating housing member 5a of the CD-side housing 5.

The spring force applied by the helical spring 34 is substantially stronger relative to the spring force applied by the helical spring 29. Although the helical spring 29 applies a rotational force to the first lever 25 in the clockwise direction around the pin 27, as shown by the arrow B in FIG. 3, this force is weaker than a torque (hereinafter referred to as a force) generated when the electromagnet E retains the armature 24 by magnetic suction force.

In addition, the first engaging portion 32a of the second lever 32 and the second end portion 25c of the first lever 25 have a hook-like shape, and the first engaging portion 32a and the second end portion 25c oppose each other with a gap S therebetween. The second lever 32 has the shape of the letter 'J', as described above, and a part of the second lever 32 extending toward the upper left is formed as the second engaging portion 32b. In FIG. 3, the upper surface of the second engaging portion 32b is in contact with the lower surface of the second end portion 25c.

Figure 7:
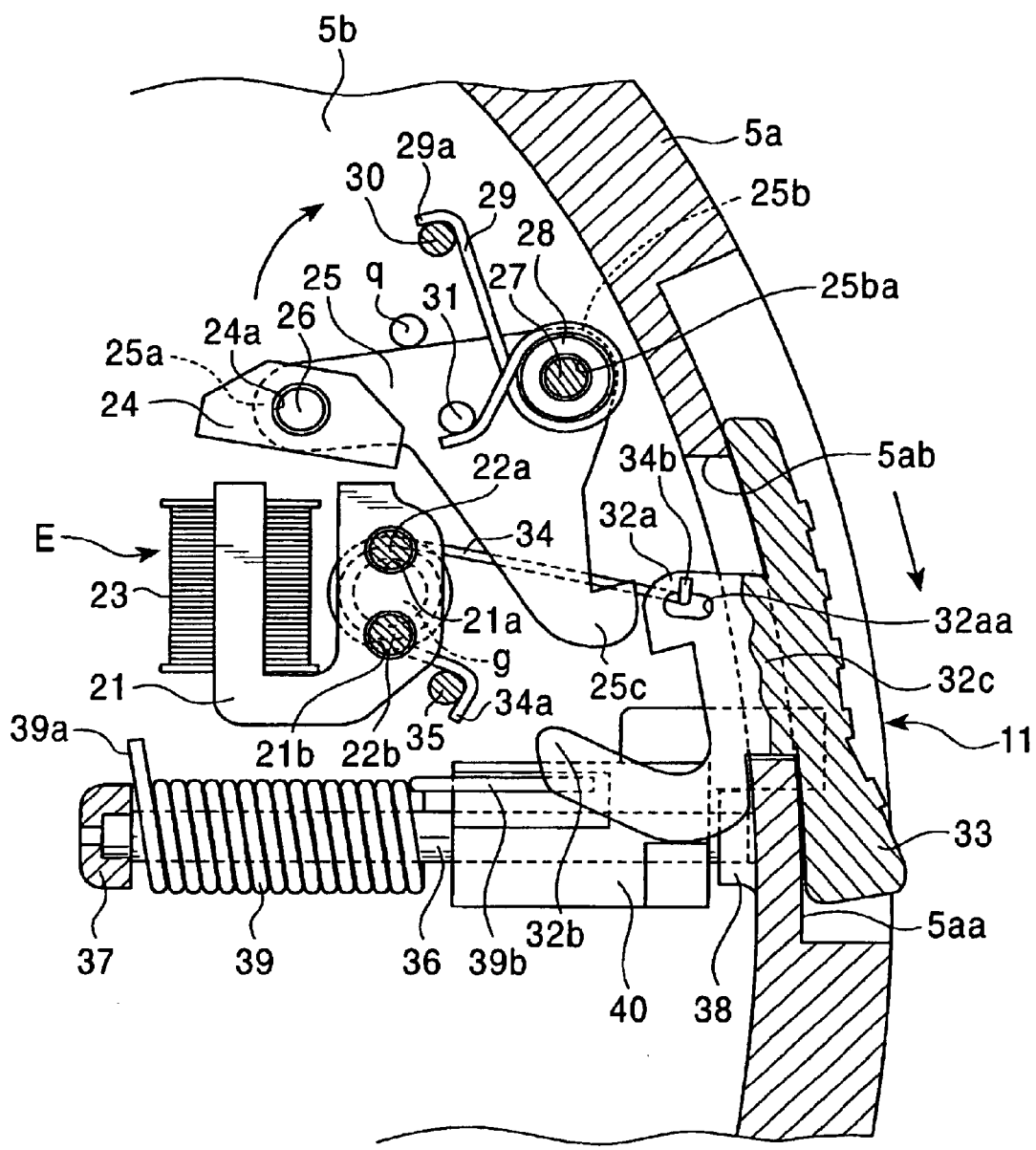
FIG. 7 is a vertical sectional view of the main part showing a manner in which the protection cover is opened.

In addition, as will be described below, when the current applied to the electromagnet E is cut off, the first lever 25 rotates clockwise around the pin 27 by the spring force applied by the helical spring 29. In such a case, as shown in FIG. 7, a side surface of the first lever 25 comes into contact with a stopper pin q, which is attached to the main body 5b for limiting the rotation of the first lever 25. Since the rotational angle of the first lever 25 is limited as described above, when the operating plate 33, which is formed integrally with the second lever 32, is moved upward from the position shown in FIG. 7, the inclined surface of the second engaging portion 32b of the second lever 32 reliably comes into contact with the curved surface of the second end portion 25c of the first lever 25. Accordingly, the second lever 32 reliably serves to rotate the first lever 25 in the counterclockwise direction.

Figure 8:
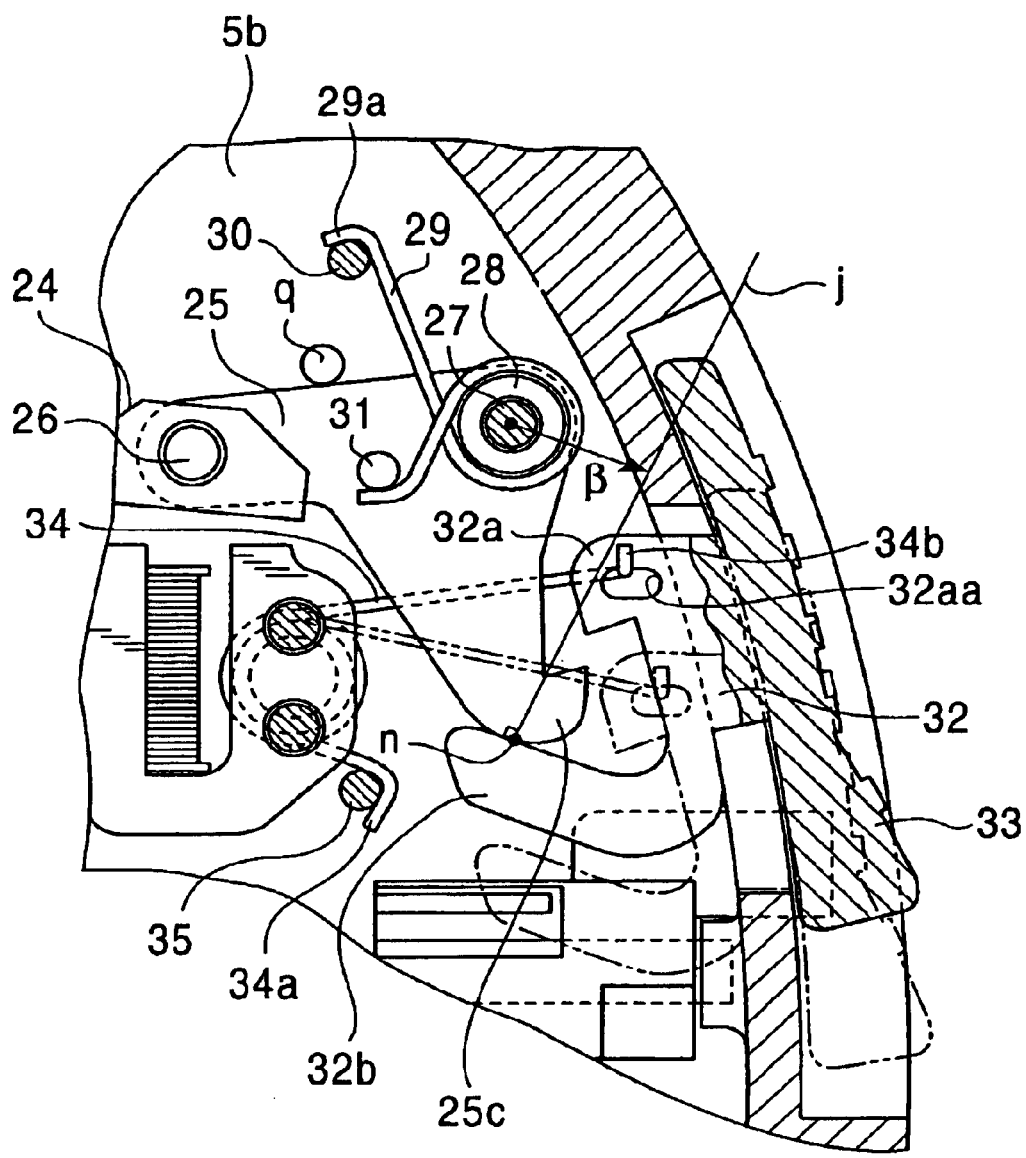
FIG. 8 is a vertical sectional view of the main part showing a manner in which the first lever and the second lever become engaged when the protection cover is opened.

FIG. 8 is a diagram which more clearly shows the above-described construction. As the operating plate 33 returns to its initial position, the second lever 32 passes the position shown in FIG. 8. More specifically, the curved surface of the second end portion 25c of the first lever 25 comes into contact with the straight, inclined surface of the second engaging portion 32b of the second lever 32 at the point n. Since the stopper pin q is provided, the contact occurs necessarily. In addition, the line j, which perpendicularly intersects the straight, inclined surface of the second engaging portion 32b at the point n, is displaced from the axial center of the pin 27 by a distance (. Accordingly, the first lever 25 is rotated counterclockwise around the pin 27 by a moment generated by the upward movement of the second lever 32, and the state shown in FIG. 3 is reliably established.

Figure 4:
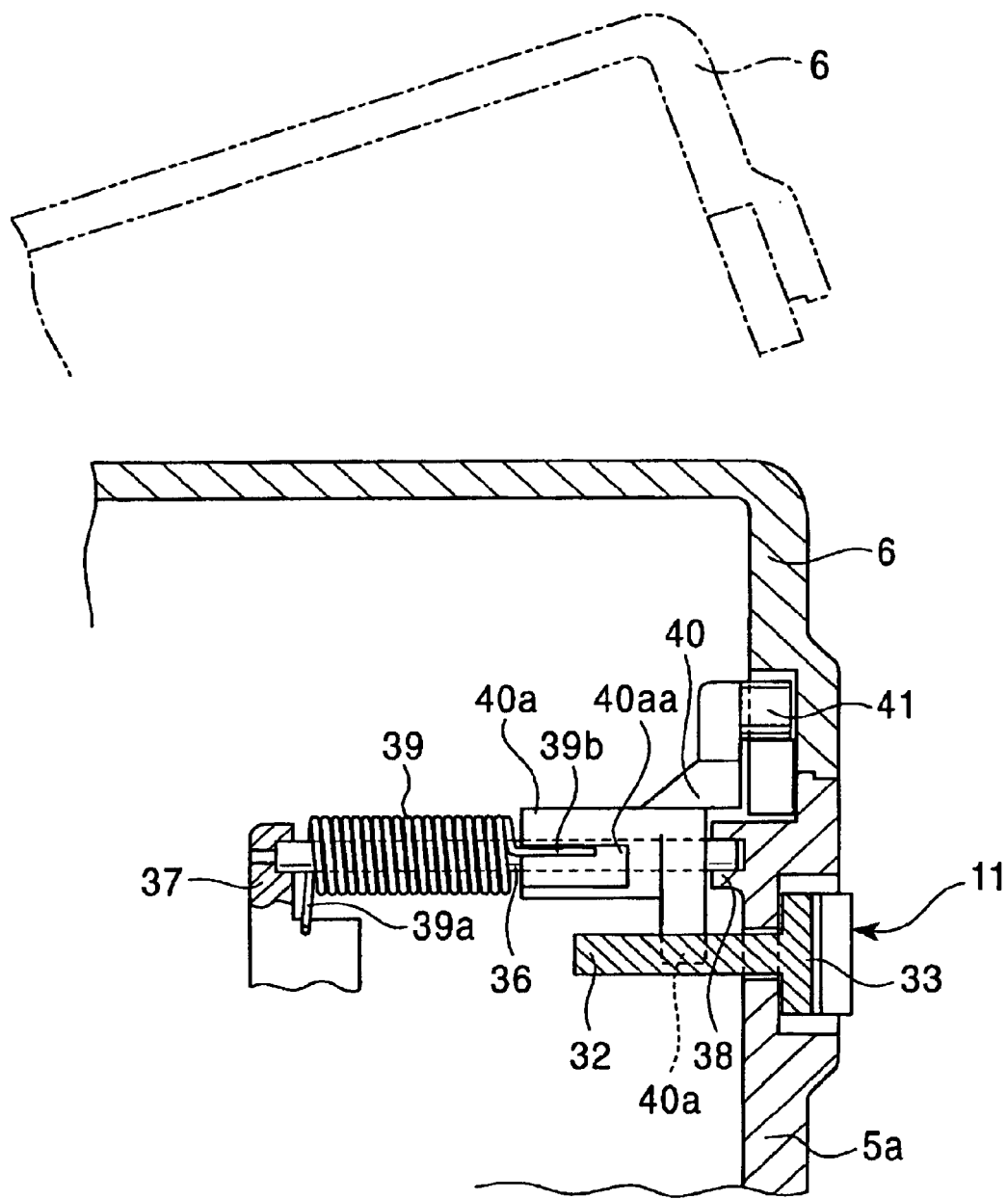
FIG. 4 is a horizontal sectional view of another main part of the protection-cover opening/closing mechanism.
Figure 5:
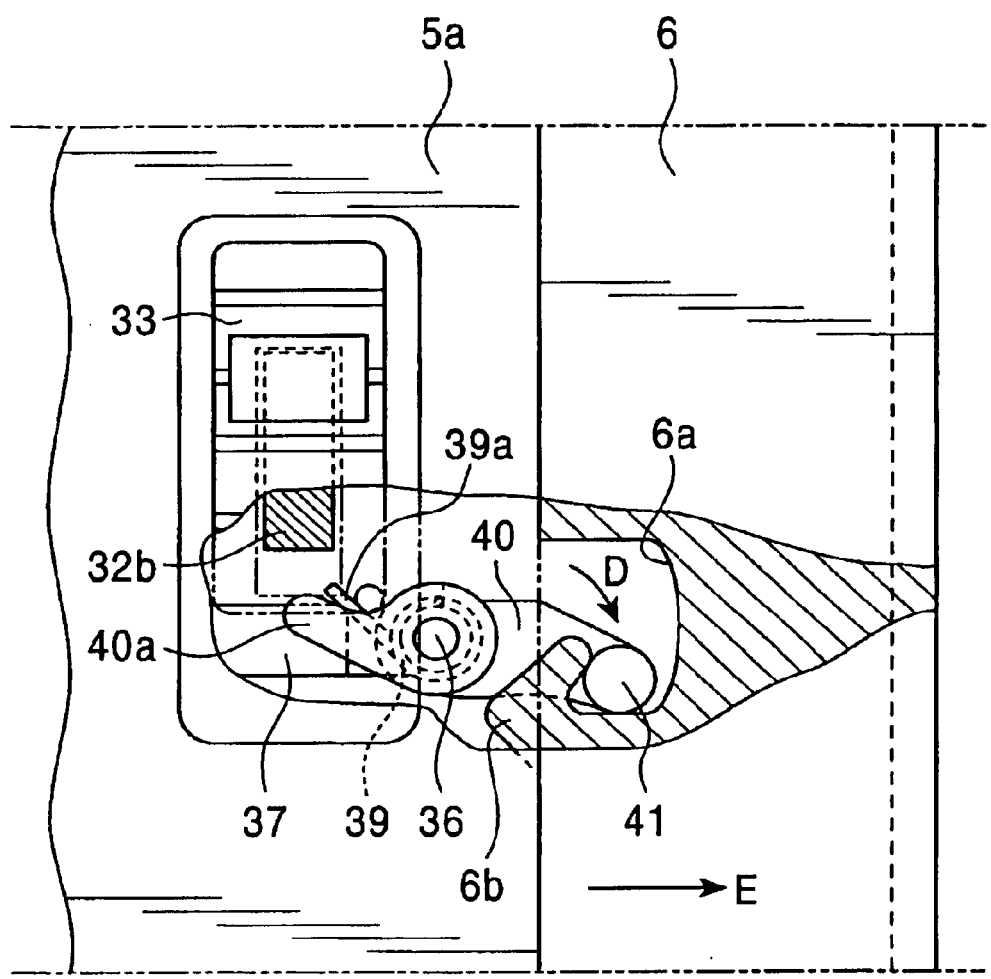
FIG. 5 is a horizontal sectional view of the main part showing a locked state in which a protection cover is restrained from rotating.

At the lower side in FIG. 3, a rotational shaft 36 which extends in the horizontal direction is rotatably supported by a bearing 37 and a boss 38 at both ends thereof, the bearing 37 being fixed to the main body 5b and the boss 38 being formed on the cover-operating housing member 5a of the CD-side housing 5. A coil spring 39 is wound around the rotational shaft 36, and, as shown in FIG. 4, an end portion 39a of the coil spring 39 at one end is retained by the bearing 37 and an end portion 39b at the other end is retained by an opening 40aa formed in a third lever 40. The third lever 40 has the shape shown in FIGS. 4 and 5, and an engaging pin 41, which serves as a locking pin, is attached to the third lever 40 at one end thereof. As shown in FIGS. 4 and 5, the engaging pin 41 is restrained and locked by a hook portion 6b, which is formed at an edge of a concavity 6a formed in the protection cover 6, which is closed in FIGS. 4 and 5. Accordingly, the protection cover 6 is locked. As shown in FIGS. 3 and 5, an end portion 40a of the third lever 40 at the other end opposes the second engaging portion 32b of the second lever 32. However, when the current is applied to the electromagnet E, they are separated from each other.

In addition, the third lever 40 receives a rotational force around the rotational shaft 36 in the direction shown by the arrow D in FIG. 5, that is, in the clockwise direction, by the coil spring 39. Accordingly, the engaging pin 41 is pressed against the bottom surface of the concavity 6a formed in the protection cover 6. In addition, the protection cover 6 receives a force in the direction toward the right, as shown by the arrow E in FIG. 5, from a spring coil wound around the pivot 7 shown in FIG. 2. Accordingly, the protection cover 6 is securely locked by the engaging pin 41.

Figure 10:
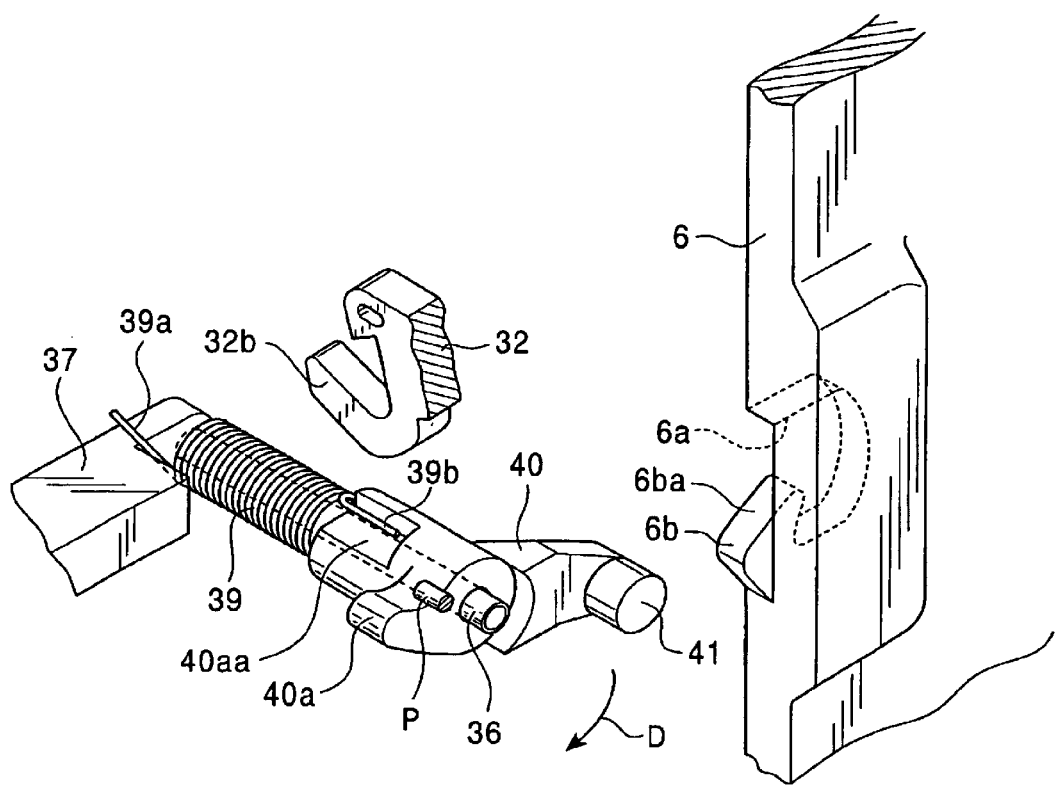
FIG. 10 is an enlarged view showing an opened protection cover and a mechanism for locking the protection cover.

FIG. 10 shows a main part of the protection-cover opening/closing mechanism in a state in which the protection cover 6 is opened. This state will be described below in detail. As described above, the third lever 40 receives the rotational force in the D direction by the coil spring 39. In order to prevent the third lever 40 from being rotated by the rotational force applied by the coil spring 39, a pin P is fixed to the housing member 5 at a position close to the end portion 40a of the third lever 40 in such a manner that the pin P abuts against the third lever 40. Accordingly, the third lever 40 is restrained at the position shown in FIG. 10. The hook portion 6b of the protection cover 6 is provided with an inclined surface 6ba which faces upward, and the inclined surface 6ba and the engaging pin 41 of the third lever 40 oppose each other.

When the second engaging portion 32b of the second lever 32 moves downward and pushes the end portion 40a of the third lever 40, the engaging pin 41 becomes disengaged from the hook portion 6b, as will be described below. Then, when the protection cover 6 is closed again, the engaging pin 41 slides on the inclined surface 6ba of the hook portion 6b, smoothly moves over the hook portion 6b, and becomes locked inside the concavity 6a again.

Figure 11:
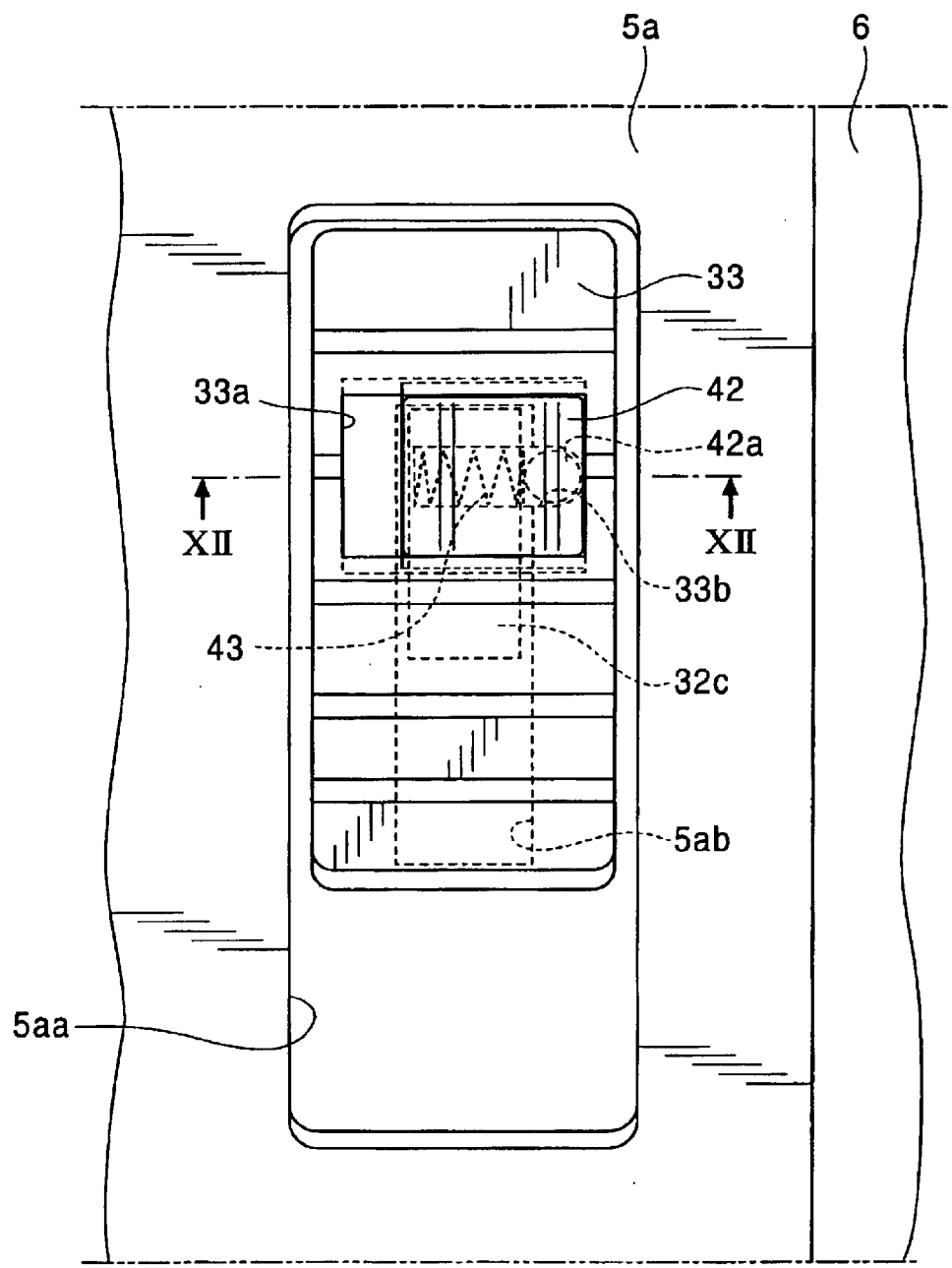
FIG. 11 is an enlarged front view of a cover opening/closing unit of the digital still camera.
Figure 12:
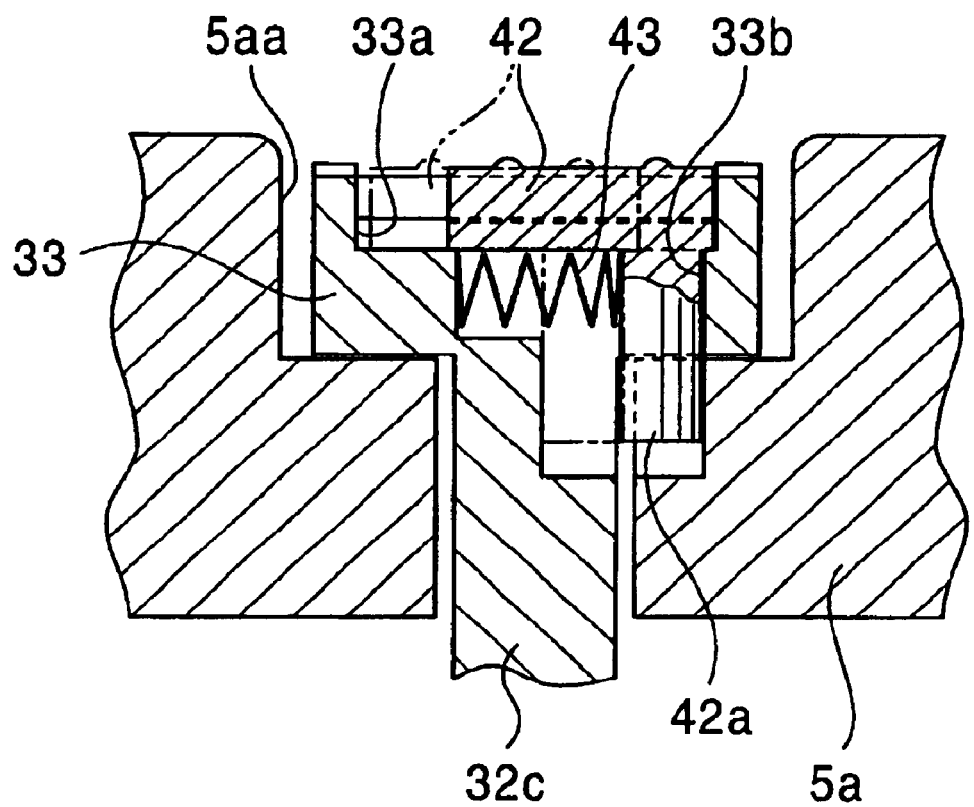
FIG. 12 is an enlarged sectional view of FIG. 11 cut along line XXII—XXII.

As shown in FIGS. 11 and 12, the cover-operating housing member 5a, which is a part of the CD-side housing 5, is provided with a rectangular groove 5aa for guiding the reciprocation of the operating plate 33. The rectangular groove 5aa is provided with the opening 5ab at the area shown in FIG. 3. A base portion 32c of the second lever 32 is fitted inside the opening 5ab, the base portion 32c being formed integrally with the operating plate 33. As described above, the operating plate 33 is pressed in the C direction in FIG. 3 by the helical spring 34. In FIG. 11, the operating plate 33 is pressed upward. The operating plate 33 is provided with a rectangular hole 33a in which a rectangular detent portion 42 is disposed in such a manner that the detent portion 42 is able to reciprocate in the horizontal direction in FIG. 11. As shown in FIG. 12, a pin 42a is attached to the detent portion 42 at one end thereof, and a compressed spring 43 is disposed between the pin 42a and the left wall of a hole 33a formed in the operating plate 33, so that the detent portion 42 is pressed toward the right in FIG. 12. As shown in FIG. 11, the pin 42a is fitted in a recess 33b having an approximately semi-cylindrical shape.

In the foregoing descriptions, the main construction according to the present embodiment is explained. Next, the operation according to the present embodiment will be described below.

When the user wishes to open the protection cover 6 while the current is being applied to the electromagnetic coil 23 of the electromagnet E, he or she pushes the operating plate 33 of the cover opening/closing unit 11 downward in FIG. 11. More specifically, the user slides the detent portion 42 disposed inside the hole 33a of the operating plate 33 leftward and pushes it downward in FIG. 11. Accordingly, the pin 42a comes out from the recess 33b, and the operating plate 33 moves downward in FIG. 3 against the pressing force applied by the helical spring 34 in the C direction in FIG. 3. The first engaging portion 32a of the second lever 32, which is formed integrally with the operating plate 33, also moves downward until it comes into contact with the second end portion 25c of the first lever 25 and the distance S between the first engaging portion 32a and the second end portion 25c becomes 0 (see FIG. 6). At this time, the first lever 25 does not rotate, since the armature 24 of the electromagnet E is restrained on the stator 21 by a magnetic suction force, and the first end portion 25a of the first lever 25 also is restrained by the pin 26. Accordingly, the second lever 32 does not move further downward and stops at the position shown in FIG. 6.

Figure 13:
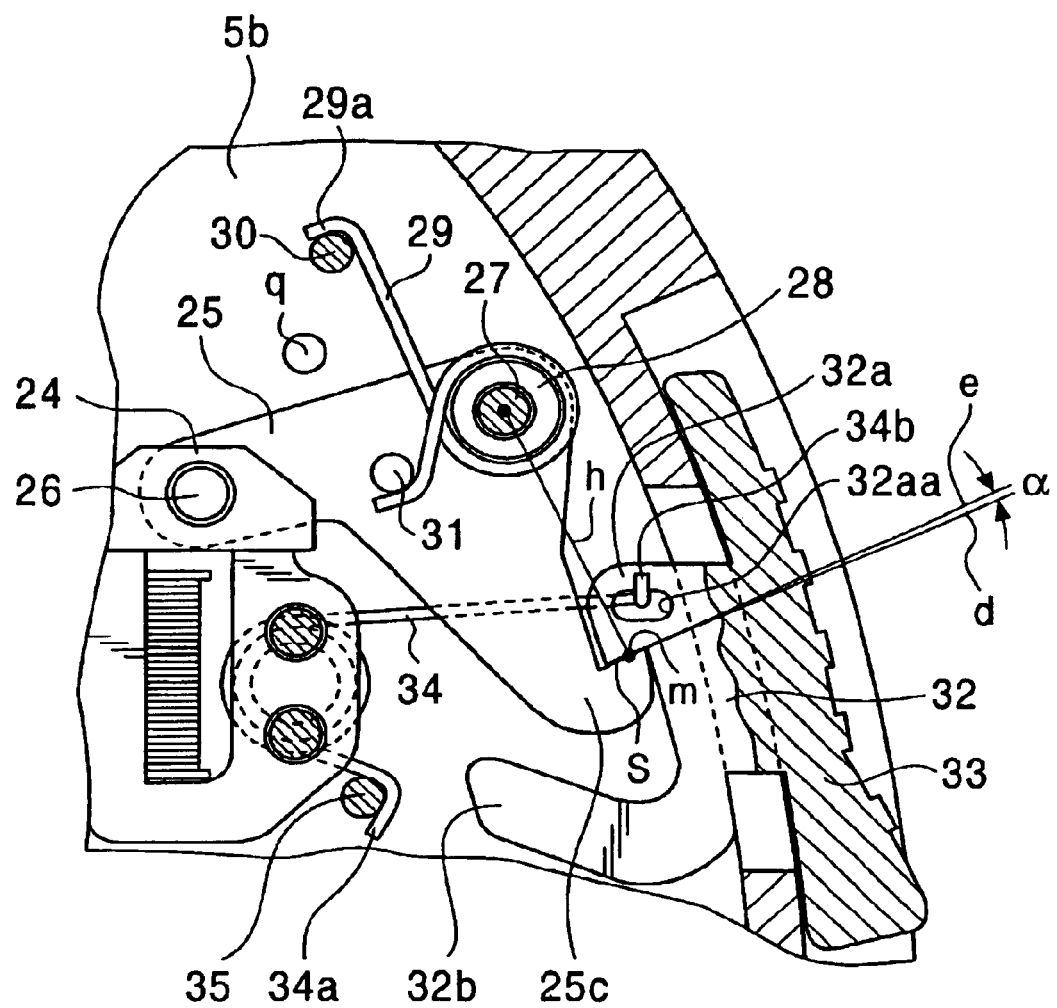
FIG. 13 is a vertical sectional view of the main part showing a manner in which the first lever and the second lever are engaged.
Figure 14:
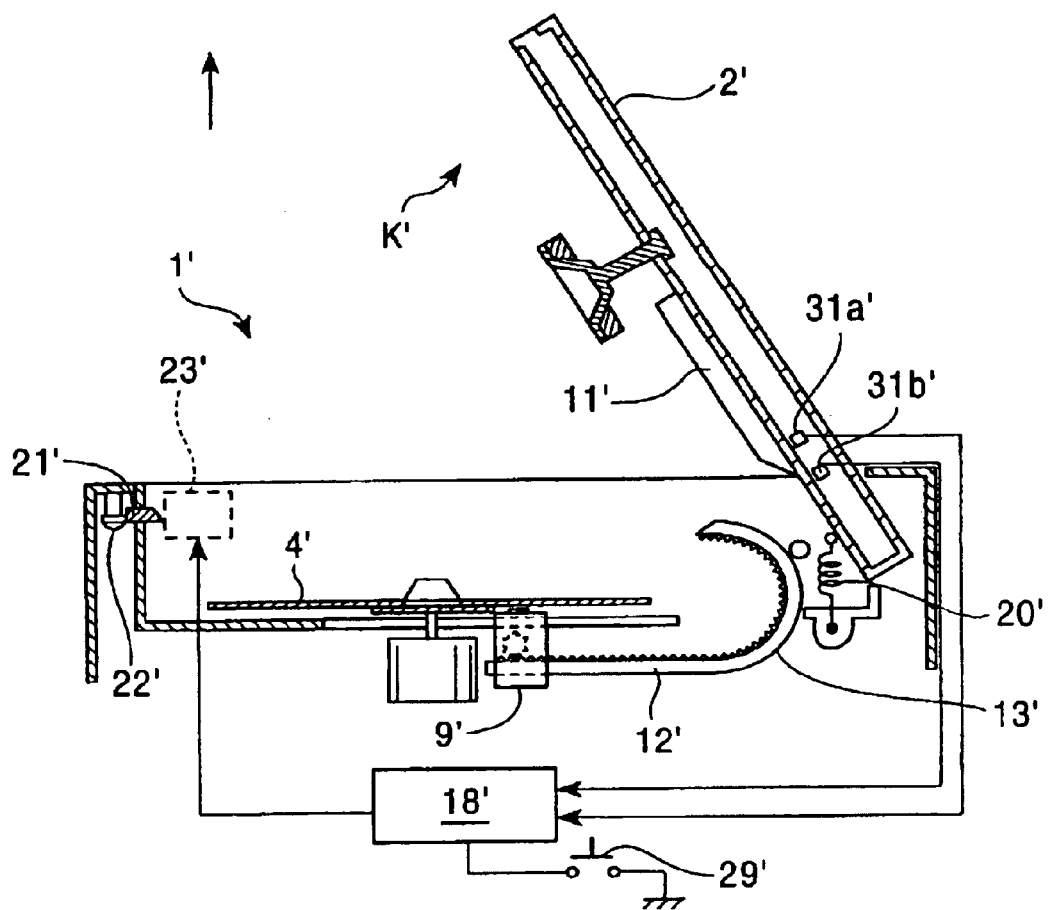
FIG. 14 is a sectional view of a recording/playback apparatus of the known art.

As shown in FIG. 13, the second end portion 25c of the first lever 25 and the first engaging portion 32a of the second lever 32 have a hook-like shape. In addition, the line h which passes the midpoint m of a contacting surface S and the axial center of the pin 27 is perpendicular to the contacting surface S. Alternatively, the contacting surface S may be slightly inclined by a small angle (in the direction in which the hook-like portions are sharpened. The angle (is shown in FIG. 13 as an angle between the line d and the line e, the line d being a line perpendicular to the line h which passes the contact point m and the axial center of the pin 27, and the line e being a line extended from the contacting surface S.

Figure 6:
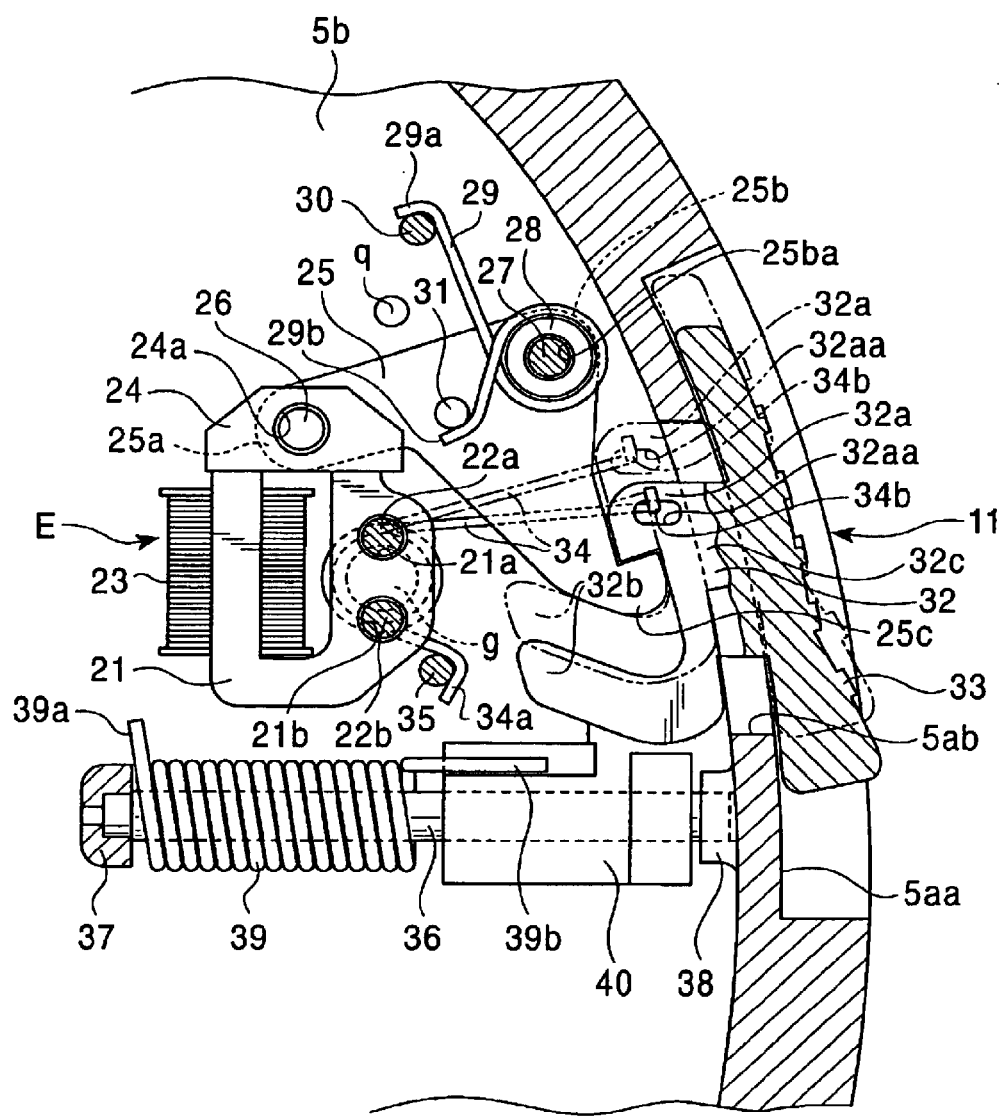
FIG. 6 is a vertical sectional view of the main part showing a manner in which the protection cover is restrained from rotating.

According to such a construction, when a downward force is applied to the operating plate 33 in FIG. 6, a moment (rotational force) around the axial center of the pin 27 generated by the force applied to the contact point m (in actuality, the force is not applied exactly at the contact point m) is approximately zero. Accordingly, even when the operating plate 33 is pressed relatively strongly, the first lever 25 does not rotate around the pin 27. Therefore, the magnetic suction force of the armature 24 of the electromagnet E may be set to a relatively small value. In addition, when the coefficient of friction between the first engaging portion 32a of the second lever 32 and the second end portion 25c of the first lever 25 is set to a normal value, such as 0.2 to 0.3, slipping therebetween does not occur. The slipping may be more reliably prevented by increasing the angle (of the contacting surface S relative to the line h. In such a case, it becomes more difficult for the first lever 25 to rotate around the pin 27. Preferably, the position of the axial center of the pin 27 is shifted toward the right in FIG. 13, so that it appears that the angle (has increased and it becomes more difficult for the first lever 25 to rotate around the pin 27.

Accordingly, the second engaging portion 32b of the second lever 32 stops at a position away from the end portion 40a of the third lever 40, and it does not push the end portion 40a Therefore, the engagement between the engaging pin 41 of the third lever 40 and the hook portion 6b of the protection cover 6 shown in FIGS. 4 and 5 is maintained, so that the protection cover 6 is prevented from being opened. Although the user has tried to open the protection cover 6, he or she senses that the movement of the operating plate 33 is stopped halfway when the first engaging portion 32a of the second lever 32 comes into contact with the second end portion 25c of the first lever 25, as shown in FIG. 6, and understands that the CD-R, which is the recording medium, is being operated and the protection cover 6 must not be opened.

Although not shown in the figures, a sensor for detecting the movement of the first engaging portion 32a of the second lever 32 until it comes into contact with the second end portion 25c of the first lever 25 may be provided at a suitable position. In such a case, a warning, such as "System under operation. Do not open protection cover,", may be shown on a display or a warning buzzer may be sounded. Alternatively, the contact of the first engaging portion 32a and the second end portion 25c also may be detected.

When the operation of the CD-R, which is the recording medium, is stopped, the current applied to the electromagnetic coil 23 of the electromagnet E is cut off. Accordingly, the armature 24 is released from the magnetic suction force applied by the stator 21. When the user pushes the operating plate 33 downward after moving the detent portion 42 leftward in FIG. 12, as described above, the second lever 32 moves downward in FIG. 3 and the second engaging portion 32b of the second lever 32 comes away from the second end portion 25c of the first lever 25. Accordingly, the first lever 25 rotates clockwise around the pin 27 by the spring force applied by the helical spring 29. The second end portion 25c of the first lever 25 becomes sufficiently distant from the first engaging portion 32a of the second lever 32 before the distance S shown in FIG. 3 becomes too small, so that the first engaging portion 32a and the second end portion 25c will not be engaged with each other.

Figure 9:
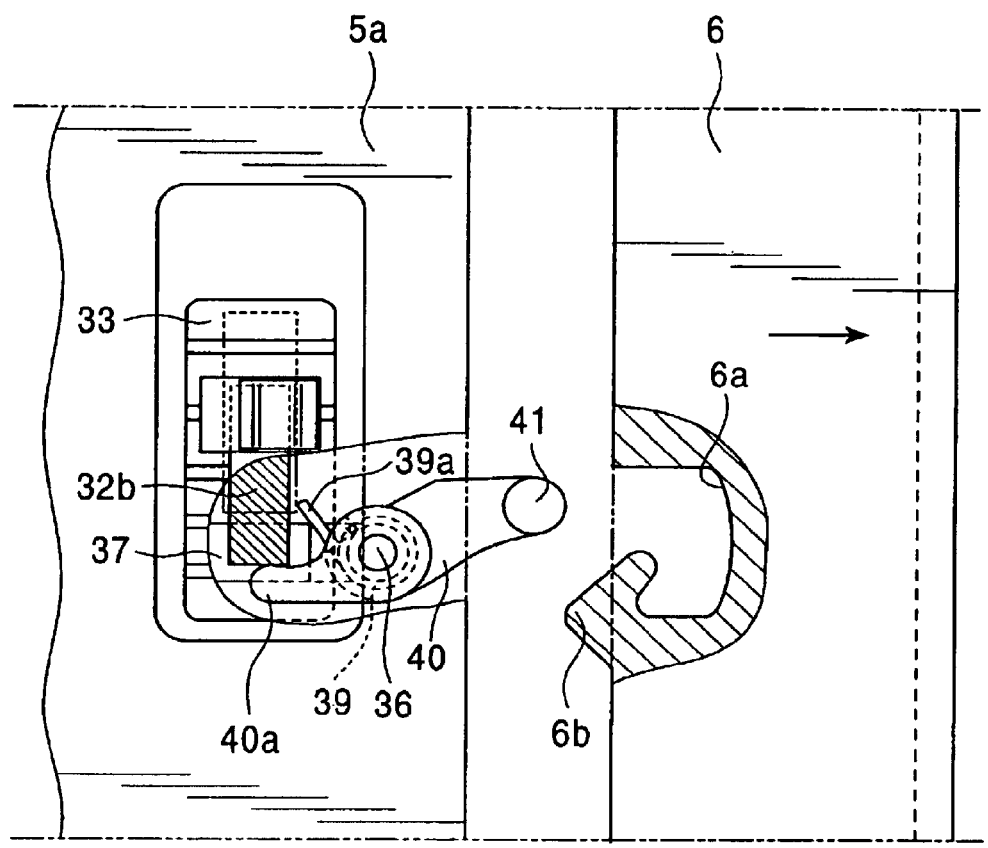
FIG. 9 is a partly broken side view showing a manner in which the protection cover opens.

The first lever 25 rotates clockwise around the pin 27 by the spring force applied by the helical spring 29, and stops at the position shown in FIG. 7 by knocking against the stopper pin q. When the operating plate 33 is further pushed against the force applied by the helical spring 34, the second engaging portion 32b of the second lever 32 finally pushes the end portion 40a of the third lever 40 as shown in FIG. 9. More specifically, with respect to FIG. 9, the third lever 40 is rotated counterclockwise around the rotational shaft 36. Accordingly, the engaging pin 41, which is formed at the other end of the third lever 40, moves upward from the position shown in FIG. 5 and becomes disengaged from the hook portion 6b of the protection cover 6. Since the protection cover 6 receives force in the opening direction A in FIG. 2 by the spring wound around the pivot 7, the protection cover 6 opens automatically.

If the user takes his or her hand off the operating plate 33 after the protection cover 6 is opened in the above-described manner, the operating plate 33 automatically returns to its initial position by the force applied by the helical spring 34 in the C direction in FIG. 3. At this time, as shown in FIG. 10, the end portion 40a of the third lever 40 is released from the second engaging portion 32b of the second lever 32. Accordingly, the third lever 40 returns to its initial position shown in FIG. 10, and the second lever 32 also returns to its initial position shown in FIG. 10. As shown in FIG. 7, the armature 24 of the electromagnet E comes away from the stator 21 once, and then, as the operating plate 33 returns to its initial position by the force applied by the helical spring 34, the inclined surface of the second engaging portion 32b comes into contact with the curved surface of the second end portion 25c of the first lever 25. Accordingly, the first lever 25 rotates counterclockwise around the pin 27, and the state shown in FIG. 3 is established again. However, at this time, the magnetic suction force is not generated since the current is not applied to the electromagnetic coil 23.

With reference to FIG. 7, when the user takes his or her hands off the operating plate 33, the second engaging portion 32b of the second lever 32 moves upward toward the second end portion 25c of the first lever 25 and comes into contact therewith. Then, the first lever 25 is rotated counterclockwise around the pin 27 by the spring force applied by the helical spring 34. The spring force of the helical coil (second helical spring) 34 is substantially larger than the spring force of the helical spring (first helical spring) 29. Since the first lever 25 is restrained by the stopper pin q, contact reliably occurs with the second engaging portion 32b of the second lever 32 and rotation of the first lever 25 is reliably performed. In addition, since the second engaging portion 32b of the second lever 32 has a straight, inclined surface and the second end portion 25c of the first lever 25 has a curved surface, rotation of the first lever 25 is smoothly performed. The friction between the second engaging portion 32b of the second lever 32 and the second end portion 25c of the first lever 25 is preferably made as small as possible, and a small roller may be provided to one of them in accordance with requirements.

Then, when the user pushes the protection cover 6 in the direction opposite to the A direction in FIG. 2 in order to close it, the engaging pin 41 of the third lever 40 slides on the inclined surface 6ba of the hook portion 6b shown in FIG. 10. Then, the engaging pin 41 is fitted behind the hook portion 6b, as shown in FIG. 5, so that the protection cover 6 is locked. When the CD-R is operated again, a current is applied to the electromagnetic coil 23 of the electromagnet E, so that the armature 24, which is a movable member, is restrained on the stator 21 by magnetic suction force. The detent portion 42 of the operating plate 33 is locked by the pin 42a, so that the protection cover 6 is prevented from being accidentally opened by any impact while the CD-R is operated.

Although the embodiment of the present invention is explained in detail in the forgoing descriptions, the present invention is of course not limited to this, and various kinds of modifications are possible within the scope of the present invention.

For example, although a digital still camera is described in the embodiment, the present invention is of course not limited to this, and the present invention may be applied to covers for protecting a recording medium used in other typical recording/playback apparatuses. In addition, the recording medium is not limited to CD-Rs, and the present invention also may be applied to recording/playback apparatuses for Compact Discs (CDs), semiconductor memories, etc.

In addition, in the above-described embodiment, the engaging pin 41 is released from the concavity 6a of the protection cover 6 by pushing the end portion 40a of the third lever 40 by the second engaging portion 32b of the second lever 32. However, it is possible to omit the third lever 40. In such a case, an L-shaped member, for example, is formed integrally with the second engaging portion 32b of the second lever 32 in such a manner that the L-shaped member extends downward from the bottom surface of the second engaging portion 32b. In addition, a portion corresponding to the engaging pin 41 is formed at the end of the horizontal part of the L-shaped member, and the concavity 6a of protection cover 6 is formed in a shape such that the concavity 6a of the above-described embodiment shown in FIG. 5 is reversed in the vertical direction. When the current applied to the electromagnet E is cut off and the second lever 32 is pushed downward against the spring force applied by the helical spring 34, the portion corresponding to the engaging pin 41 is released from the concavity 6a of the protection cover 6 (the concavity 6a has a shape such that the concavity 6a shown in FIG. 5 is reversed in the vertical direction). Accordingly, the protection cover 6 opens. Furthermore, other various constructions of the protection-cover opening mechanism can be considered.

What is claimed is:

1. A protection-cover opening/closing mechanism for a recording/playback apparatus, the protection cover opening/closing mechanism comprising: an electromagnet which includes a stator around which an electromagnetic coil is formed and a movable member; first lever means to which the movable member is pivotally attached at a first end portion of the first lever means, which is supported in such a manner that the first lever means is rotatable around a first axis; first force-applying means which applies a rotational force around the first axis to the first lever means; second lever means that is disposed on a stationary member in such a manner that the second lever means is able to, reciprocate by sliding on the stationary member in a direction away from and toward an initial position, and which is engageable with a second end portion of the first lever means; and second force-applying means which applies a force to the second lever means in the direction toward the initial position; wherein, while a recording medium is being operated, current is applied to the electromagnetic coil to restrain the movable member on the stator by magnetic suction force and thereby prevent the first lever means from rotating around the first axis, and movement of the second lever means in the direction away from the initial position is limited within a limit position due to the engagement between the second end portion of the first lever means and the second lever means, thereby locking a protection cover at a closed position, and, when the recording medium is not being operated, current is not applied to the electromagnetic coil, so it becomes possible to open the protection cover by moving the second lever means away from the initial position beyond the limit position.

2. A protection-cover opening/closing mechanism apparatus according to claim 1, further comprising third lever means that is engageable with the second lever means at a first end portion of the third lever means, which includes an engaging portion at a second end portion of the third lever means, the engaging portion being engageable with a hook portion of the protection cover; and a third force-applying means, which applies a rotational force around a second axis to the third lever means, wherein, when the recording medium is not being operated, current is not applied to the electromagnetic coil, so it becomes possible to open the protection cover by engaging the second lever means with the third lever means.

3. A protection-cover opening/closing mechanism according to claim 1, wherein the first force-applying means comprises a first helical spring of which one end is retained by a pin fixed on the first lever means and the other end is retained by a pin fixed on the stationary member, wherein the second lever means is provided with a first engaging portion and a second engaging portion, both of which are engageable with the second end portion of the first lever means, and the second force-applying means comprises a second helical spring of which one end is retained by a pin fixed on the stationary member and the other end is retained by the first engaging portion of the second lever means, and wherein a spring force of the second helical spring is larger than a spring force of the first helical spring.

4. A protection-cover opening/closing mechanism for a recording/playback apparatus according to claim 2, wherein the third force-applying means is a coil spring of which one end is retained by the stationary member and the other end is retained by the third lever means.

5. A protection-cover opening/closing mechanism according to claim 4, wherein the second engaging portion of the second lever means is engageable with the third lever means.

6. A protection-cover opening/closing mechanism according to claim 3, wherein, while a current is being applied to the electromagnetic coil, the second end portion of the first lever means is normally engaged with the second engaging portion of the second lever means and becomes engaged with the first engaging portion of the second lever means when the second lever means is moved away from the initial position, thereby limiting movement of the second lever means it the direction away from the initial position.

7. A protection-cover opening/closing mechanism according to claim 1, wherein a warning indicating that the recording medium is being operated is issued when movement of the second lever means in the direction away from the initial position is detected.

8. A protection-cover opening/closing mechanism according to claim 1, wherein a stopper is provided for limiting rotation of the first lever means by the first force-applying means.

9. A protection-cover opening/closing mechanism according to claim 1, wherein the second end portion of the first lever means and the first engaging portion of the second lever means are formed in the shape of hooks which come into contact with each other, and a line passing the midpoint of a surface of contact and an axial center of the first axis is approximately perpendicular to the surface of contact.

* * * * *

UNITED STATES PATENT AND TRADEMARK OFFICE
CERTIFICATE OF CORRECTION

PATENT NO. : 6,930,727 B2
DATED : August 16, 2005
INVENTOR(S) : Uwagawa et al.

It is certified that error appears in the above-identified patent and that said Letters Patent is hereby corrected as shown below:

Column 10,
Line 49, "means it" should read -- means in --.

Signed and Sealed this

Eighth Day of November, 2005

JON W. DUDAS
*Director of the United States Patent and Trademark Office*